(12) United States Patent
Jackson et al.

(10) Patent No.: US 9,499,706 B2
(45) Date of Patent: Nov. 22, 2016

(54) PIGMENTED CYAN INKJET INK

(71) Applicant: E. I. DU PONT DE NEMOURS AND COMPANY, Wilmington, DE (US)

(72) Inventors: Christian Jackson, Wilmington, DE (US); James A. Silver, Kennett Square, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 84 days.

(21) Appl. No.: 14/764,452

(22) PCT Filed: Jan. 30, 2014

(86) PCT No.: PCT/US2014/013798
§ 371 (c)(1),
(2) Date: Jul. 29, 2015

(87) PCT Pub. No.: WO2014/120897
PCT Pub. Date: Aug. 7, 2014

(65) Prior Publication Data
US 2016/0002478 A1  Jan. 7, 2016

Related U.S. Application Data

(60) Provisional application No. 61/759,591, filed on Feb. 1, 2013.

(51) Int. Cl.
| | |
|---|---|
| *C09D 11/322* | (2014.01) |
| *B41J 2/21* | (2006.01) |
| *C08K 5/3417* | (2006.01) |
| *C09D 11/40* | (2014.01) |

(52) U.S. Cl.
CPC ............ *C09D 11/322* (2013.01); *B41J 2/2107* (2013.01); *C08K 5/3417* (2013.01); *C09D 11/40* (2013.01)

(58) Field of Classification Search
CPC ............ B41M 5/0011; B41M 5/0017; B41M 5/0256; B41M 5/52; B41M 5/5218; B41M 7/00; B41M 7/0072; B41M 7/0081; B41M 7/009; B41J 2/01; B41J 2/0057; B41J 2/05; B41J 2/1433; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; C09D 11/005; C09D 11/30; C09D 11/32; C09D 11/322; C09D 11/328; C09D 11/36; C09D 11/38; C09D 11/40; C09D 11/52; C09D 11/54; C09D 11/101; C08K 5/3417
USPC ...................... 347/9–22, 56, 86, 88, 95–105; 106/31.13, 31.27, 31.6, 31.85, 31.77; 523/160, 161
See application file for complete search history.

(56) References Cited

U.S. PATENT DOCUMENTS

| | | | | |
|---|---|---|---|---|
| 5,274,025 | A * | 12/1993 | Stockl | C08L 67/00 524/513 |
| 2005/0284329 | A1* | 12/2005 | Jackson | C09D 11/40 106/31.6 |
| 2005/0284330 | A1* | 12/2005 | Jackson | C09D 11/40 106/31.6 |
| 2007/0247565 | A1* | 10/2007 | Sasaki | C09B 67/0022 349/70 |
| 2011/0030580 | A1* | 2/2011 | Jackson | C09D 11/40 106/31.6 |
| 2013/0068131 | A1* | 3/2013 | Bermel | C09D 11/322 106/31.89 |
| 2013/0070031 | A1* | 3/2013 | Nelson | B41J 2/105 347/82 |
| 2013/0072614 | A1* | 3/2013 | Lindstrom | C09D 11/40 524/388 |

\* cited by examiner

*Primary Examiner* — Stephen Meier
*Assistant Examiner* — Alexander D Shenderov
(74) *Attorney, Agent, or Firm* — Simon L. Xu

(57) ABSTRACT

The present disclosure pertains to a cyan pigmented inkjet ink and uses thereof in inkjet ink sets and inkjet printing. More particularly, the present disclosure pertains to an ink that is cyan in color and comprises a mixed pigment colorant.

16 Claims, No Drawings

PIGMENTED CYAN INKJET INK

BACKGROUND OF THE DISCLOSURE

The present disclosure pertains to a pigment-based inkjet ink and uses thereof in inkjet ink sets and inkjet printing. More particularly, the present disclosure pertains to an ink that is blue in color and comprises a mixed pigment colorant.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY). An ink set also commonly comprises a black ink (CMYK).

Color characteristics of pigment-containing inks play an important role in the quality of the printed ink jet image. Perceived color quality can be characterized using any one of several color-space systems such as CIELAB (CIE No. 15.2, *Colorimetry*, 2nd. Ed., Commission Internationale de l'Eclarage, Vienna, Austria, 1986) or Munsell (*Munsell Book of Color*, Munsell Color Co., Baltimore, Md., 1929), as is well known in the art. With respect to Munsell color space, a given color is defined using three terms, namely Hue, Value and Chroma. With respect to CIELAB color space, a color is defined using three terms L*, a* and b*. In this system L* defines the lightness of the color and it ranges from 0 (black) to 100 (white). The terms a* and b* together define the hue, where a* ranges from a negative number (green) to a positive number (red) and b* ranges from a negative number (blue) to a positive number (yellow). Additional terms such as hue angle) (h°) and chroma (C*) can also be used to describe a given color instead of a* and b*, where $$h° = \tan^{-1}\left(\frac{b^*}{a^*}\right);$$

and $$C^* = \sqrt{a^{*2} + b^{*2}}.$$

To achieve full color images, ink jet printers typically employ a cyan ("C"), magenta ("M") and yellow ("Y") ink. These colors are known as subtractively-mixing primaries, as light is subtracted as it passes through the colorant. When these colors are mixed in pairs they form red, green and blue (so-called "secondaries"), and when all are mixed together they form black. Thus these three-color inks can be used to print the entire range of hues with good chromaticity and/or color saturation.

The range of colors that a given ink set can print is called the color gamut, and can be described in the CIELAB system by the volume in the L*a*b* color space that encompasses a palette of representative colors that can be printed by the ink set on a given substrate. While a CMY ink set can produce all possible color hues, the color gamut does not encompass all the colors that can be perceived by the human eye. Thus there is still a desire to improve the printed image quality and extend the range of colors that can be printed.

Copper phtalocyanine pigment blue is widely used as a cyan pigment colorant in ink jet printing. However, the hue angle of this pigment is slightly bluer than a true cyan color and becomes increasingly more blue as the saturation or optical density of the color increases. Consequently, mixing of cyan inks containing copper phtalocyanine pigment blue with yellow inks tends to reduce the available color gamut in the green region. The present disclosure provides cyan ink compositions with a true cyan color and increased color gamut by mixing Pigment Blue 15 with Pigment Green 7.

SUMMARY OF THE DISCLOSURE

An embodiment provides a cyan ink jet ink comprising a pigment colorant and an aqueous vehicle, characterized in that the pigment colorant comprises a mixture of Pigment Blue 15 and Pigment Green 7.

Another embodiment provides that the total amount of pigment colorant present in the cyan ink is at least 1% by weight, based on the total weight of the ink.

Another embodiment provides that the weight ratio of the Pigment Blue 15 to the Pigment Green 7 is from 10:1 to 1:4.

Another embodiment provides that the weight ratio of the Pigment Blue 15 to Pigment Green 7 is from 5:1 to 1:1.

Another embodiment provides that the cyan ink has a surface tension in the range of 20 dyne/cm to 70 dyne/cm at 25° C., and a viscosity of 30 cP or less at 25° C.

Another embodiment provides an ink set comprising a plurality of differently colored inkjet inks, characterized in that at least one of the inks is a cyan inkjet ink as set forth above.

Another embodiment provides an ink set further comprising a magenta pigmented ink and a yellow pigmented ink.

Another embodiment provides an ink set further comprising a black ink.

Yet another embodiment provides an inkjet printer equipped with a cyan ink or an ink set as set forth above.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any sub combination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using dispersing equipment.

As used herein, the term "OD" means optical density.

As used herein, the term "aqueous vehicle" refers to water or a mixture of water and at least one water-soluble, or partially water-soluble (i.e., methyl ethyl ketone), organic solvent (co-solvent).

As used herein, the term "substantially" means being of considerable degree, almost all.

As used herein, the term "dyne/cm" means dyne per centimeter, a surface tension unit.

As used herein, the term "cP" means centipoise, a viscosity unit.

As used herein, the term "mPa·s" means millipascal second, a viscosity unit.

As used herein, the term "mN·m$^{-1}$" means milliNewtons per meter, a surface tension unit.

As used herein, the term "mS·cm$^{-1}$" means milliSiemens per centimeter, a conductivity unit.

As used herein, the term "TMXDI" means m-tetramethylene xylylene diisocyanate.

As used herein, Eternacoll® UH-50 is a polycarbonate diol from UBE Industries, Tokyo, Japan.

As used herein, the term "DBTL" means dibutyltin dilaurate.

As used herein, Terathane® 650 is a polyether diol from Invista, Wichita, Kans.

As used herein, the term "BMEA" means bis(methoxyethyl)amine.

As used herein, the term "BzMA" means benzyl mathacrylate.

As used herein, the term "MAA" means methyl acrylic acid.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means diethylenetriamine-N,N,N',N'',N''-pentaacetic acid.

As used herein, the term "GEDTA" means glycoletherdiamine-N,N,N',N'-tetraacetic acid.

As used herein, the term "jettability" means good jetting properties with no clogging or deflection during printing.

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

Aqueous Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present disclosure are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present disclosure may contain about 60% to about 95% water, based on the total weight of the aqueous vehicle.

The amount of aqueous vehicle in the ink is typically in the range of about 70% to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynols® series from Air Products), ethoxylated primary (e.g., Neodol® series from Shell) and secondary (e.g., Tergitol® series from Union Carbide) alcohols, sulfosuccinates (e.g., Aerosol® series from Cytec), organosilicones (e.g., Silwet® series from Witco) and fluoro surfactants (e.g., Zonyl® series from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink. Surfactants may be used, typically in an amount of from about 0.01% to about 5%, and specifically from about 0.2% to about 2%, based on the total weight of the ink.

Colored Inks

Colored inks comprise a vehicle, preferably an aqueous vehicle, and a colorant. The colorant can be a soluble dye and/or a dispersed pigment in the ink vehicle.

Colorants are referred to herein by their "C.I." designation established by Society Dyers and Colourists, Bradford, Yorkshire, UK and published in the *The Color Index*, Third Edition, 1971. That designation uses a perceived color as part of the name, but there is no formal spectral definition of what constitutes orange, red, violet, blue, green, etc. For the purposes of this disclosure, ink color will be named according to hue angle ranges as follows.

| Color | Hue Angle Range |
| --- | --- |
| Red | 10-70 |
| Yellow | 70-120 |
| Green | 120-180 |
| Cyan | 180-250 |
| Blue | 250-320 |
| Magenta | 320-10 |

In choosing colorants for an inkjet ink set, the hue angle for a given color preferably falls within the following ranges.

| Color | Hue Angle Range |
| --- | --- |
| Red | 15-65 |
| Yellow | 75-110 |

-continued

| Color | Hue Angle Range |
|---|---|
| Green | 135-165 |
| Cyan | 195-230 |
| Blue | 265-305 |
| Magenta | 325-360 |

The hue angle is preferably determined by printing an ink onto high quality inkjet media, such as photo paper, and measuring the color with a spectrometer, as generally understood by those of ordinary skill in the art, and as explained in further detail below.

The cyan ink of the present disclosure comprises a mixture of Pigment Blue 15 and Pigment Green 7. The hue angle of Pigment Blue 15 is slightly bluer than a true cyan color and becomes increasing more blue as saturation of pigment or optical density of the printed images increases. Mixing a small amount of Pigment Green 7 with Pigment Blue 15 shifts the hue angle to form an ink with a true cyan color. Typically, the amount of pigment colorant in the ink will be at least about 1 percent by weight, based on the total weight of the ink. The weight ratio of Pigment Blue 15 to Pigment Green 7 is typically from about 4:1 to about 1:4, and more typically from about 3:1 to about 1:3.

As indicated above, the cyan ink of the present disclosure will typically be used as part of an ink set comprising a plurality of colored inks Usually, an ink set requires inks with the primary colors, CMY, from the inventive cyan ink, a yellow ink and a magenta ink.

The term "ink set" refers to all the fluids an inkjet printer is equipped to jet. These fluids include the colored inks referred to above. Other inks (or fluids) could also be present such as, for example, an additional colorless ink containing a durability or gloss enhancing ingredient which would be applied after all of the colored inks (a "topcoat") to increase abrasion resistance and/or gloss of the printed images.

The ink set can be advantageously expanded with other colors, especially the secondary colors red (R) and green (G) and blue (B). Thus, a typical ink set can include CMYRGB wherein the cyan ink is the inventive cyan ink prescribed herein.

The colored inks other than the cyan ink of the present disclosure may be pigment and/or dye based inks Each of the inks in the ink set individually comprises a colorant dispersed and/or dissolved in the vehicle.

Useful pigments for the other inks of the ink set include:
a magenta colorant selected from one or any combination of Pigment Red 122 and Pigment Red 202;
a yellow colorant selected from one or any combination of Pigment Yellow 14, Pigment Yellow 74, Pigment Yellow 95, Pigment Yellow 110, Pigment Yellow 114, Pigment Yellow 128 and Pigment Yellow 155;
a red colorant selected from one or any combination of Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264;
a green colorant selected from one or any combination of Pigment Green 1, Pigment Green 2, Pigment Green 7 and Pigment Green 36; and
carbon black as a black colorant.

Pigmented inks other than the present cyan ink may comprise a single pigment species, or mixtures of two or more pigment species. The "pigment content" in a given ink refers to the total pigment present in that ink, regardless of whether it is a single pigment species or a combination of two or more pigment species.

Pigments, traditionally, are stabilized to dispersion in a vehicle by dispersing agents, such as polymeric dispersants or surfactants. More recently, self-dispersing (or self-dispersible) pigments have been developed. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation. Thus, a pigment may be stabilized to dispersion by surface treatment to be self-dispersing (see: for example, WO01/94476, the disclosure of which is incorporated by reference herein for all purposes as if fully set forth), by treatment with dispersing agents in the traditional way, or by some combination of surface treatment and dispersing agents.

The polymeric dispersant for the non-self-dispersing pigment(s) may be a random or a structured polymer. Typically, the polymer dispersant is a copolymer of hydrophobic and hydrophilic monomers. The term "random polymer" means polymers where molecules of each monomer are randomly arranged in the polymer backbone. For a reference on suitable random polymeric dispersants, see: U.S. Pat. No. 4,597,794. The term "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117.

The range of useful pigment particle size is typically from about 0.005 micron to about 15 micron. Typically, the pigment particle size should range from about 0.005 micron to about 5 micron; and, specifically, from about 0.005 micron to about 1 micron. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Other Additives

Other ingredients, additives, may be formulated into the inkjet ink, to the extent that such other ingredients do not interfere with the stability and j ettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid)

(EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, by weight based on total weight of the ink.

In a colored ink, colorant will generally be present in amounts up to about 12%, and more typically in the range of about 1% to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink. Surfactants, when added, are generally in the range of about 0.2 to about 3% by weight based on the total weight of the ink. Polymers, other than polymeric fixing agents, can be added as needed, but will generally be less than about 15% by weight based on the total weight of the ink.

Printer

The printer can be any suitable inkjet printer, including those that are commercially produced and widely available. Such printers are well known to one skilled in the art.

Such printers can be, for example, those equipped with a printhead array that is fixed in position (fixed array).

The printer can be, for example, similar to that described in U.S. Pat. No. 6,443,555 (the disclosure of which is incorporated by reference herein for all purposes as if fully set forth). The printhead(s) for such a printer can be, for example, those described in U.S. Pat. No. 6,426,014 and US20020033863 (the disclosures of which are also incorporated by reference herein for all purposes as if fully set forth). Ink jet printers are responsive to digital data signals.

The fixed array printers will generally be capable of printing at least about 600 dpi, preferably at least about 1200 dpi, and more preferably at least about 1600 dpi. Printing is preferably accomplished in one pass and thus the printhead is configured to achieve the stipulated dpi in a single pass of the substrate through the print zone.

The width of the printing zone is at least as wide as the width of the area to be printed so that printing can be performed rapidly in one pass. Accordingly, printheads of this sort are commonly referred to as page-wide arrays or full-width arrays. For so-called "SOHO" (small office, home office) and "network" printing, the width of the printing zone is at least wide as standard papers, such as A4 size paper and/or letter size (8.5×11 inch) paper. For so-called "wide-format" printing, the print zone is preferably at least about 36 inches wide and can accommodate media that is fed from a roll.

Although the ink droplets ejected from a printhead can be of any suitable volume, preferably droplets are less than about 10 pL, and more preferably in the range of about 1 to about 5 pL, even more preferably about 1 to about 2 pL.

Substrates

Substrates suitable for use in the present disclosure can be any useful substrate known to those of ordinary skill in the relevant art. For example, the substrate can be plain paper such as common electrophotographic copier paper. The substrate can also be specialty media such as microporous papers, polymer coated papers and hybrids of the two. The substrate can be polymeric film such as vinyl chloride and polyester. Polymeric films are especially useful in wide-format applications such as signs, billboards and banners. The substrate can be a non-woven textile such as spun bonded polyolefin (e.g. Tyvek®, DuPont Co.). The substrate can also be woven textile such as silk, cotton, nylon and polyester.

Examples

Polyurethane Dispersant 1, Tergitol Terminated TMXDI/Terathane650

Dispersant 1 was prepared following a procedure disclosed in WO2012009408A2. To a dry, alkali- and acid-free flask equipped with an additional funnel, a condenser and a stirrer, under a nitrogen atmosphere, were added Terathane® 650 (156 g), DMPA (94.4 g), Sulfolane (220 g) and DBTL (0.06 g). The resulting mixture was heated to 60° C. and thoroughly mixed. To this mixture was added TMXDI (236 g) via the additional funnel mounted on the flask followed by rinsing any residual TMXDI in the additional funnel into the flask with Sulfolane (15 g). The temperature of the reaction mixture was raised to 100° C. and maintained at 100° C. until the isocyanate content reached 1.2% or below. The temperature was then cooled to 90° C. and maintained at 90° C. while Tergitol 15-S-7 (65.7 g) and BMEA (0.6 g) were added via the additional funnel over a period of 5 minutes followed by rinsing with Sulfolane (5 g). After holding the temperature for 60 minutes at 90° C., aqueous KOH (637 g, 3% by weight) was added over a period of 10 minutes via the additional funnel followed by de-ionized water (402 g). The mixture was maintained at 60° C. for 1 hr and cooled to room temperature to provide a polyurethane dispersant with 29.6% of solids.

Polyurethane Dispersant 2, Alanine Terminated TMXDI/UH-50

To a dry, alkali- and acid-free flask equipped with an additional funnel, a condenser and a stirrer, under a nitrogen atmosphere, were added Eternacoll® UH-50 (129 g), DMPA (96 g), Sulfolane (329 g) and DBTL (0.06 g). The resulting mixture was heated to 60° C. and thoroughly mixed. To this mixture was added TMXDI (257 g) via the additional funnel mounted on the flask followed by rinsing any residual TMXDI in the additional funnel into the flask with Sulfolane (15 g). The temperature of the reaction mixture was raised to 100° C. and maintained at 100° C. until the isocyanate content reached 0.9% or below. The temperature was then cooled to 60° C. and maintained at 60° C. while aqueous alanine solution (179 g, prepared by dissolving 17.8 g of alanine and 8 g of KOH in 153.2 g of de-ionized water) was added via the additional funnel over a period of 5 minutes followed by rinsing the residual alanine solution in the additional funnel into the flask with Sulfolane (5 g). After holding the temperature for 5 minutes at 60° C., aqueous KOH (757.4 g, 3% by weight) was added over a period of 10 minutes via the additional funnel followed by de-ionized water (5 g). The mixture was maintained at 60° C. for 1 hr and cooled to room temperature to provide a polyurethane dispersant with 33.5% of solids.

Acrylic Dispersant 1, Diblock 13BzMA//10MAA

A 5-liter round bottom flask was dried with a heat gun under nitrogen purge and equipped with a mechanical stirrer, thermocouple, nitrogen inlet, drying tube outlet, and addition funnels. Tetrahydrofuran (THF, 802 g), was cannulated to the flask. An initiator (1,1-bis(trimethylsilyloxy)-2-methyl propene, 81.5 g (0.345 moles)) was injected followed by a catalyst (tetrabutyl ammonium m-chlorobenzoate, 0.85 ml of a 1.0 M solution in acetonitrile). A monomer feed containing trimethylsilyl methacrylate (554.9 g, 3.53 mol) was added over 45 minutes while the reaction exothermed to 72° C. A solution containing a catalyst tetrabutyl ammonium m-chlorobenzoate (0.85 ml of a 1.0 M solution in acetonitrite and THF, 7.35 g) was introduced via a syringe pump during the monomer feed. After an 1 hr hold, HPLC indicated greater than 97% monomer conversion. A second monomer feed containing benzyl methacrylate (803.5 g, 5.10 mol) was added over 45 minutes. After a 60 min hold, HPLC indicated greater than 99% monomer conversion. To the reaction mixture was added methanol (247.2 g), and a distillation process involving slowly heating the mixture to 120° C. while adding 2-pyrrolidone (2-P) was utilized to remove THF and other volatile by-products. The final polymer solution contained 40.55% of solids with a measured acid number of 190.4 mg KOH/gram of polymer solids. The polymer had molecular weights of 4638 (Mn) and 5065 (Mw), and a polymer density of 1.09 as measured by gas phase chromatography.

Preparation of Pigmented Dispersions

The following procedure was used to prepare pigmented dispersions. Using an Eiger Minimill, a premix was prepared at typically 20-30% pigment loading and the targeted dispersant level was selected at a pigment/dispersant (P/D) ratio of 1.5-3.0. A P/D of 2.5 corresponds to a 40% dispersant level on pigment. Optionally, a co-solvent was added at 10% of the total dispersion formulation to facilitate pigment wetting and dissolution of dispersant in the premix stage and ease of grinding during milling stage. Although other similar co-solvents are suitable, triethylene glycol monobutyl ether (TEB as supplied from Dow Chemicals) was the co-solvent of choice. The polyurethane dispersants of the present disclosure were pre-neutralized with either KOH to facilitate solubility and dissolution into water. During the premix stage, the pigment level was maintained at typically 27%, and was subsequently reduced to about 24% during the milling stage by the addition of de-ionized water for optimal media mill grinding conditions. After completion of the milling stage, which was typically 4 hours, the remaining letdown of de-ionized water was added and thoroughly mixed.

All the pigmented dispersions processed with co-solvent were purified using an ultrafiltration process to remove co-solvent(s) and filter out other impurities that may be present. After completion, the pigment levels in the dispersions were reduced to about 10 to 15%. The dispersions are summarized in Table 1 below.

TABLE 1

|  | Cyan Dispersion 1 | Yellow Dispersion 1 | Green Dispersion 1 |
|---|---|---|---|
| Pigment | Pigment Blue 15 | Pigment Yellow 74 | Pigment Green 7 |
| Dispersant | Polyurethane Dispersant 1 | Polyurethane Dispersant 2 | Acrylic Dispersant 1 |
| P/D | 3 | 3 | 2 |

Preparation of Inks

Inks were prepared by mixing pigment dispersions in a typical aqueous ink vehicle and de-ionized water. Inventive Inks A-B, control Ink 1 and comparative Inks 1-3 were prepared as listed in Table 2 below.

TABLE 2

|  | (Control) | (Comparative) | | (Inventive) | |
|---|---|---|---|---|---|
|  | Ink 1 | Ink 2 | Ink 3 | Ink A | Ink B |
| Cyan Dispersion 1* | 2.75% | 2.75% | 2.75% | 2.75% | 2.75% |
| Yellow Dispersion 1* | — | 0.1% | 0.3% | — | — |
| Green Dispersion 1* | — | — | — | 0.1% | 0.3% |

TABLE 2-continued

|  | (Control) | (Comparative) | | (Inventive) | |
| --- | --- | --- | --- | --- | --- |
|  | Ink 1 | Ink 2 | Ink 3 | Ink A | Ink B |
| Aqueous Vehicle DI Water | 25.6% Balance to 100% | 25.6% Balance to 100% | 25.6% Balance to 100% | 25.6% Balance to 100% | 25.6% Balance to 100% |

Print Testing

Inks were filled into cartridges and printed from an HP8000 DeskJet printer onto Xerox 4200 and Hewlett Packard Multipurpose papers. Optical Density, Saturation and Hue angle were measured with a Greytag Spectrophotometer.

As shown in Table 3 below, Ink 1, a control ink made with a cyan dispersion containing Pigment Blue 15, had hue angles of greater than 246 degree when printed on Xerox and HP Multipurpose papers. Such hue angles are at the upper end of cyan region bordering the blue region, and a reduction in hue angle is desirable for a true cyan color. Comparative Inks 2-3, made by addition of a yellow dispersion containing Pigment Yellow 74 to the cyan dispersion, showed a significant decrease in hue angles when printed comparing to the control Ink 1. However, the color gamut volume also decreased significantly.

TABLE 3

|  | (Control) | (Comparative) | |
| --- | --- | --- | --- |
|  | Ink 1 | Ink 2 | Ink 3 |
| Optical Density on Xerox 4200 | 0.87 | 0.88 | 0.89 |
| Optical Density on HP Multipurpose | 1.03 | 1.05 | 1.06 |
| Saturation on Xerox 4200 | 0.80 | 0.66 | 0.65 |
| Saturation on HP Multipurpose | 0.99 | 0.83 | 0.84 |
| Hue on Xerox 4200 (degree) | 246 | 216 | 201 |
| Hue on HP Multipurpose (degree) | 248 | 216 | 201 |
| Color gamut Volume (L*a*b* units) on HP Multipurpose | 264,000 | 251,000 | 235,000 |

As shown in Table 4 below, inventive Inks A-B, made by addition of a green dispersion containing Pigment Green 7 to the cyan dispersion containing Pigment Blue 15, showed a reduction in hue angle and an increased in color gamut volume comparing to the control Ink 1.

TABLE 4

|  | Ink 1 (Control) | Ink A | Ink B |
| --- | --- | --- | --- |
| Optical Density on Xerox 4200 | 0.87 | 0.88 | 0.89 |
| Optical Density on HP Multipurpose | 1.03 | 1.05 | 1.10 |
| Saturation on Xerox 4200 | 0.80 | 0.79 | 0.78 |
| Saturation on HP Multipurpose | 0.99 | 0.97 | 0.99 |
| Hue on Xerox 4200 (degree) | 246 | 243 | 240 |
| Hue on HP Multipurpose (degree) | 248 | 245 | 241 |
| Color gamut Volume (L*a*b* units) on HP Multipurpose | 264,000 | 270,000 | 267,000 |

The invention claimed is:

1. A cyan ink jet ink comprising a pigment colorant and an aqueous vehicle, characterized in that said pigment colorant comprises a mixture of Pigment Blue 15 and Pigment Green 7.

2. An inkjet printer equipped with an ink as set forth in claim 1.

3. The cyan inkjet ink of claim 1, characterized in that the total amount of pigment colorant present is at least 1% by weight, based on the total weight of the ink.

4. An inkjet printer equipped with an ink as set forth in claim 3.

5. The cyan inkjet ink of claim 1, characterized in that the weight ratio of said Pigment Blue 15 to said Pigment Green 7 is from 10:1 to 1:4.

6. An inkjet printer equipped with an ink as set forth in claim 5.

7. The cyan inkjet ink of claim 5, characterized in that the weight ratio of said Pigment Blue 15 to Pigment Green 7 is from 5:1 to 1:1.

8. An inkjet printer equipped with an ink as set forth in claim 7.

9. The cyan inkjet ink of claim 1, having a surface tension in the range of 20 dyne/cm to 70 dyne/cm at 25° C., and a viscosity of 30 cP or less at 25° C.

10. An inkjet printer equipped with an ink as set forth in claim 9.

11. An inkjet ink set comprising a plurality of differently colored inkjet inks, characterized in that at least one of the inks is a cyan inkjet ink according to claim 1.

12. An inkjet printer equipped with an ink set as set forth in claim 11.

13. The inkjet ink set of claim 11, further comprising a magenta pigmented ink and a yellow pigmented ink.

14. An inkjet printer equipped with an ink set as set forth in claim 13.

15. The inkjet ink set of claim 13, further comprising a black ink.

16. An inkjet printer equipped with an ink set as set forth in claim 15.

\* \* \* \* \*